No. 750,480. PATENTED JAN. 26, 1904.
J. McLARTY.
ATTACHMENT FOR BICYCLES.
APPLICATION FILED JULY 23, 1903.
NO MODEL. 2 SHEETS—SHEET 1.

Witnesses  John McLarty, Inventor.

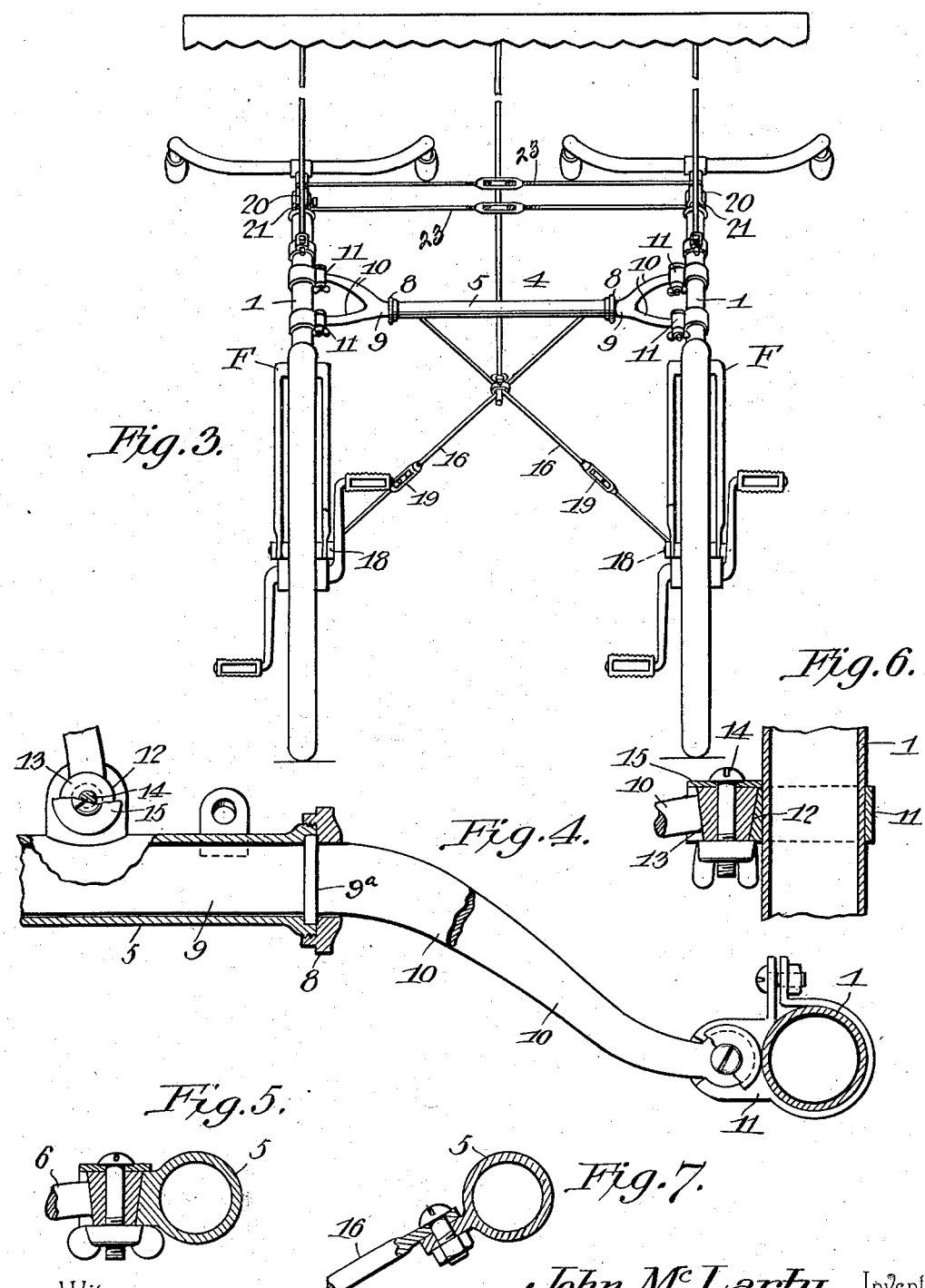

No. 750,480. Patented January 26, 1904.

UNITED STATES PATENT OFFICE.

JOHN McLARTY, OF SEATTLE, WASHINGTON.

ATTACHMENT FOR BICYCLES.

SPECIFICATION forming part of Letters Patent No. 750,480, dated January 26, 1904.

Application filed July 23, 1903. Serial No. 166,755. (No model.)

*To all whom it may concern:*

Be it known that I, JOHN MCLARTY, a citizen of the United States, residing at Seattle, in the county of King and State of Washington, have invented a new and useful Attachment for Bicycles, of which the following is a specification.

This invention relates generally to attachments for bicycles, and more particularly to the coupling attachments for bicycles by means of which two bicycles may be so connected as to form substantially a single structure in which the two bicycles are securely held in parallel position, so that the combined structure will have a stability not found in single bicycles.

The principal object of the invention is to provide, in a coupling attachment for bicycles, means whereby bicycles of different sizes and patterns may be securely connected in perfect parallelism, so that the two bicycles may be operated as a single vehicle and be susceptible of being steered and driven by a single rider.

A further object of the invention is to provide a coupling device for bicycles which may be readily applied to or detached from two bicycles, which will be readily attachable to bicycles of any of the ordinary forms of safety-frames, and which will prevent any departure of the bicycles from a position of true parallelism after the coupling device has been properly secured in position.

With the objects above stated and others in view, which will appear as the invention is more fully disclosed, the same consists in the novel construction and combination of parts hereinafter described and claimed, and illustrated in the accompanying drawings, forming part of this specification, in which corresponding parts are designated by the same characters of reference throughout, it being understood that various changes in the form, proportions, and exact manner of assemblage of the elements exhibited may be made without departing from the spirit of the invention.

Figure 1:
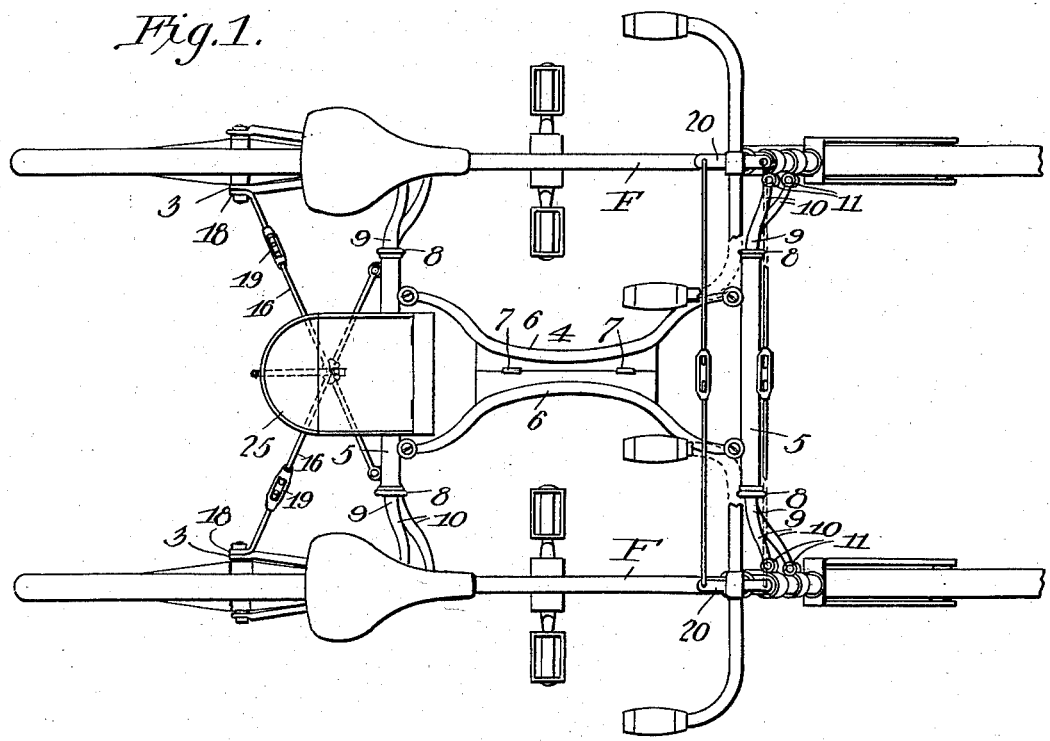
Figure 2:
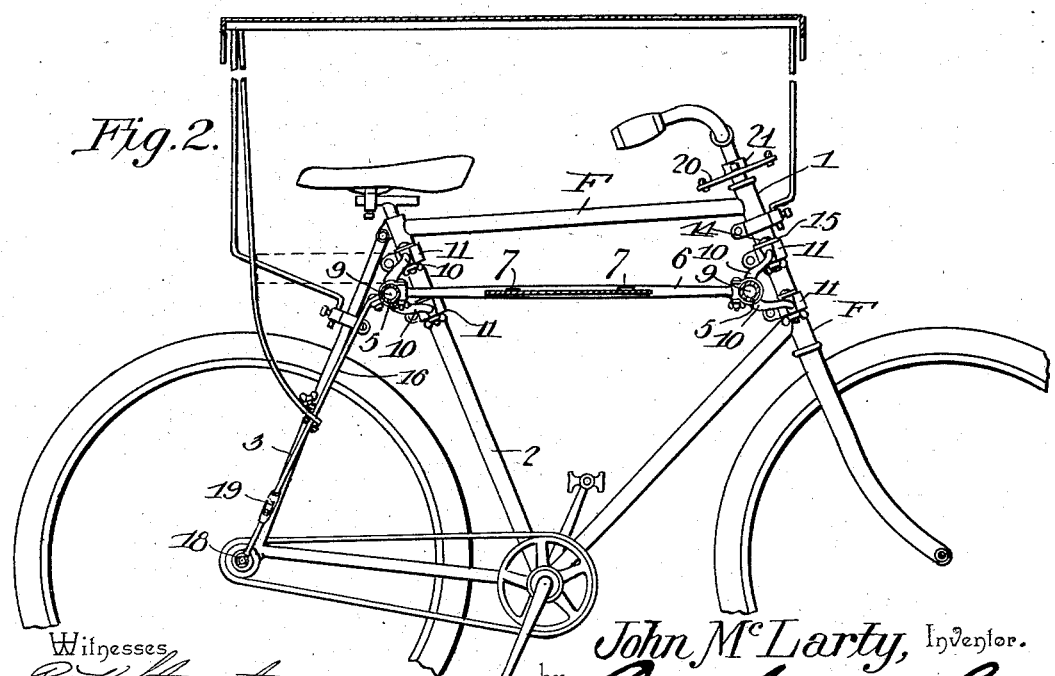

In the drawings, Figure 1 is a plan view of the coupling attachment applied to two bicycles. Fig. 2 is a longitudinal section, in vertical plane, through the coupling device near the median line, showing the mode of attachment to one of the bicycles shown in Fig. 1 and showing a canopy designed for use in connection with the coupling device. Fig. 3 is a front view of two bicycles connected by the coupling attachment and having a canopy mounted thereon. Fig. 4 is a detail view, partly in section and partly in plan, showing the connection of the forks with the cylinders and the connection of the longitudinal members with the cylinders, as well as the connection of the forks with the clips at the ends thereof. Fig. 5 is a detail view in section through the connection between one of the longitudinal braces and one of the cylinders. Fig. 6 is a detail view in section through one of the clips and the end of one of the fork-prongs. Fig. 7 is a detail view showing the connection of one of the diagonal braces with the rear cylinder.

Referring to the drawings in detail, F F designate generally the frames of two bicycles, each comprising a head 1, a main brace 2, and rear forked members 3.

The coupling attachment comprises a frame designated generally as 4 and designed for attachment in a horizontal plane between two bicycles. The frame 4 consists of two transverse tubular members or cylinders 5 5 and the longitudinal curved members 6 6, which are hinged together about midway between their ends, as shown at 7 7. The cylinders 5 5, which are preferably about fifteen inches in length, are externally threaded at their outer ends and are slightly counterbored to form seats for flanges $9^a$ upon rods 9, whose external diameter is slightly less than the internal diameter of the cylinders, so that the rods may fit loosely therewithin and provide for a certain amount of independent vertical movement of each of the bicycles when connected by means of the coupling attachment. The rods are secured in position by means of cap-nuts 8, which engage with the threads at the ends of the cylinders 5 and contact with the flanges $9^a$ upon the rods 9. At the outer ends of the rods 9 are forks 10, provided at the ends of their prongs with clips 11, detachably secured to the prongs in the manner presently to be explained. The clips 11 may be of any suitable form and are designed to be clamped upon the heads 1 and main braces 2 of the bicycle-frames F F.

The clips 11 are connected with the fork-prongs 10 by means of a form of joint which is also used to connect the curved longitudinal members 6 6 with the cylinders 5 5. The form of joint employed in all of these connections is illustrated in Figs. 4, 5, and 6 and comprises in each instance a dovetailed socket 12 and a coöperating dovetailed head 13. The dovetailed sockets are formed upon the clips and upon the cylinders, and the dovetailed heads are provided at the ends of the fork-prongs and at the ends of the curved longitudinal members. The sockets 12 taper slightly toward the bottom, so that when the heads 13 are forced downward therein they jam tightly and prevent any lateral play of the heads in the sockets. In order to hold the heads 13 in the sockets 12, I provide small bolts 14 and washers 15 sufficiently wide to cover the upper sides of the heads 13 and hold them in firm contact with the walls of the sockets 12.

The frame described in the foregoing paragraphs is when attached to the two bicycles disposed in a horizontal plane and may be adjusted by means of the cap-nuts 8 to such position that the upper portions of the frames F F are exactly parallel; but in order to brace the lower portions of the frames against lateral movement braces must be provided extending diagonally from the rear cylinder of the frame 4 to the lower rear portions of the bicycle-frames F F. The diagonal braces preferably employed are designated generally as 16 16 and are pivotally connected at their upper ends with the rear transverse tubular member 5, from which they extend backward and downward and terminate at their rear ends in suitable eyes 18, by means of which their ends are rigidly secured to the usual nuts on the rear axles. In order to bring the lower portions of the bicycle-frames into proper relation, each of said braces 16 is provided intermediate of its ends with a turnbuckle 19, and means is thereby afforded for extending or shortening each of said braces so as to bring about the desired adjustment. The braces 16 form, in connection with the frame 4, already described, means whereby the frames F F of the two bicycles may be rigidly connected and held in perfect parallelism. Means must now be provided whereby the steering may be effected by a single rider and whereby when both riders are steering the movements of one steering-head may be exactly duplicated in the movements of the other. In accomplishing this object I prefer to use the bars 20, each provided about midway of its length with an eye 21 for the passage of the stem of a handle-bar on one of the bicycles and having a set-screw 22 for clamping the handle-bar stem in fixed relation to the eye. The bars 20 are mounted on the stem of the handle-bars of the two bicycles in a fixed position, and each is made exactly parallel to the front wheel of the bicycle on which it is carried. The two bars 20 are connected by rods 23, pivotally mounted in openings in the ends of said bars, as best seen in Fig. 1, and form, together with the bars, a parallelogram. When the handle-bars are connected by means of the parallelogram of bars and rods just described, the pivotal movements of each handle-bar must be exactly duplicated by the pivotal movements of the other.

In order to facilitate the carrying of packages or a child on bicycles connected by means of my improved coupling attachment, I provide on the rear tubular transverse member 5 a detachable bundle-carrier or child's seat 25, which is of sectional structure and may be readily folded to occupy but small space.

In connection with the improved coupling-bar I find it desirable to employ a canopy of suitable material supported upon uprights, which may be secured to any convenient portions of the frame 4, which is disposed horizontally between the bicycle-frames, as already stated.

It will have been readily observed from the foregoing description that the coupling device is of a character adapted to effect a very solid connection between two bicycle-frames, so that a rider upon one may propel and steer both bicycles even though the other bicycle be used by a second rider. It will also have been observed that while the principal object of this invention is to provide means for connecting two bicycles in a thoroughly-satisfactory manner it has also been an object to provide a coupling device which may be readily folded into small compass to facilitate storing away.

The mode of applying and adjusting a coupling device to a pair of bicycles having been already explained in the foregoing paragraphs of the specification and the operation of the connecting device being obvious from the description of the construction thereof, further and more detailed description of the use of the device is regarded as unnecessary.

Having thus described the construction and uses of my invention, what I claim as new, and desire to secure by Letters Patent, is—

1. The combination in a coupling device for bicycles, of a horizontally-disposed frame comprising transverse members provided on their opposite faces with dovetailed sockets and curved longitudinal members hinged together midway between their ends and provided at their ends with dovetailed heads to coöperate with said sockets.

2. The combination in a coupling device for bicycles, of a horizontally-disposed frame comprising transverse members made up of telescopically-associated sections, downwardly-tapering dovetailed sockets rigidly attached to said transverse members and curved longitudinal members hinged together midway of their ends and provided with tapered dovetailed heads for locking engagement with said sockets.

3. A bicycle-coupling device consisting of a horizontally-disposed frame having tubular transverse members with open ends, forks having threaded stems of slightly-smaller diameter than the internal diameter of said tubular members, cap-nuts mounted on said threaded forked stems and adapted to close the ends of said tubular members, curved longitudinal members detachably connected with said transverse members and hinged together intermediate of their ends.

In testimony that I claim the foregoing as my own I have hereto affixed my signature in the presence of two witnesses.

JOHN McLARTY.

Witnesses:
   FRANK FISHER,
   M. DOYLE.